G. E. DARIER.
GAS AND LIQUID CONTACT APPARATUS.
APPLICATION FILED DEC. 30, 1916.
1,327,422.
Patented Jan. 6, 1920.
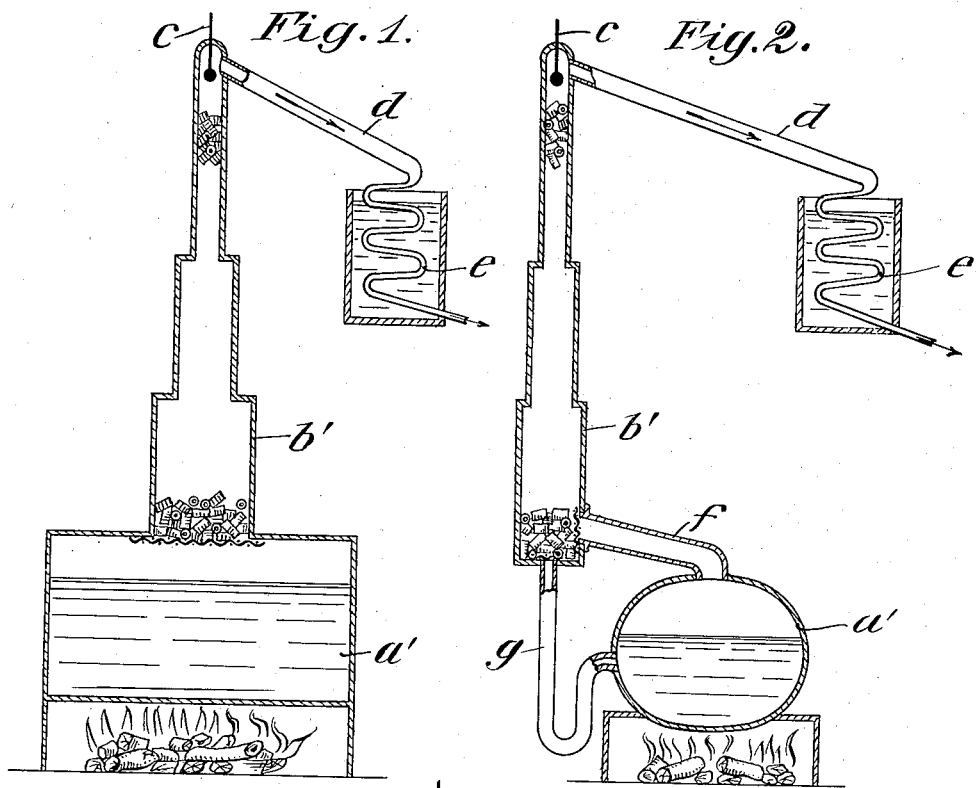
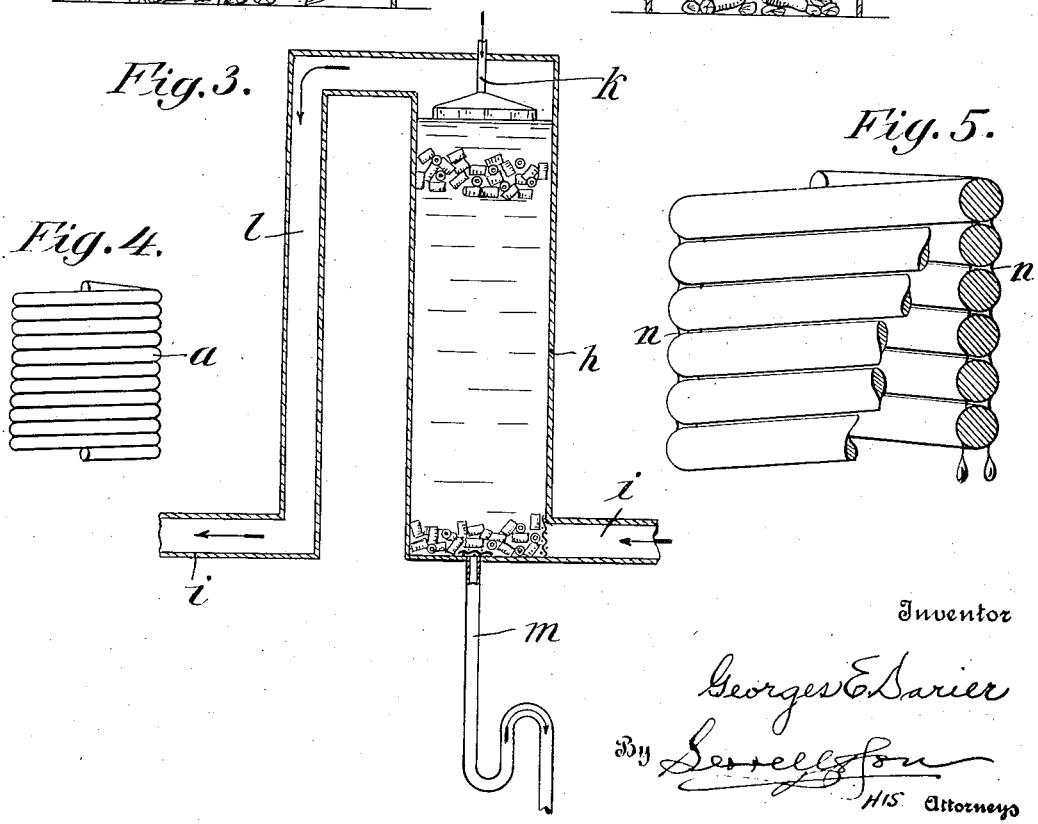
Inventor
Georges E. Darier
By Serrell Son
HIS Attorneys

UNITED STATES PATENT OFFICE.

GEORGES EDMOND DARIER, OF CHÊNE, NEAR GENEVA, SWITZERLAND.

GAS AND LIQUID CONTACT APPARATUS.

1,327,422.  Specification of Letters Patent.  Patented Jan. 6, 1920.

Application filed December 30, 1916. Serial No. 139,786.

*To all whom it may concern:*

Be it known that I, Dr. GEORGES EDMOND DARIER, chemist, a citizen of Switzerland, residing at Chêne, near Geneva, in the Confederation of Switzerland, have invented certain new and useful Improvements in Gas and Liquid Contact Apparatus, of which the following is a specification.

I am aware that heretofore various structures have been employed for the fractional distillation of liquids and for the washing of gases by liquids. For example: there have been used small cylinders having a diameter equal to their length, and these cylinders are obtained either by cutting a metallic plate into ribbons which are thereafter bent round, or by sawing metallic tubes, or even by molding an earth substance so that after burning rigid cylinders are formed thereof. In the same patent these small cylinders are described as heaped up pell-mell in a distilling column so as to present a large surface to the liquid to be distilled and to compel changes in the direction of the paths of the gases which pass through them. This property is not new, however as I am aware it has been employed in the laboratories by the use of cylindrical glass pearls or small pieces of glass tubes heaped up on one another to facilitate distillation of the washing of the gases.

I have found it possible to increase to a very high degree the efficiency of apparatus of the kind hereinbefore referred to by replacing the filling now generally used by coils of closely wound wire, or threads of metal, or other suitable material. These coils, which have the appearance of helical springs, are made by rolling or winding a wire thread of metal or other material, such as glass for instance, upon a suitable form, such for example as a metal bar of circular or other cross section, so as to make close convolutions of the turns of the coil.

Since these coils are closely wound, the drops of the liquid to be distilled, or of the liquid used for the washing of the gases adhere to the surfaces of the coils, due to capillary action, and form in this manner closed cylindrical columns or walls of the liquid.

By comparison all dimensions being the same, that is the diameter, length and thickness of the walls, the active surface of the coils made in accordance with this invention with the active surface of the cylinders having continuous walls as used heretofore, it is found that this active surface of the coils is much greater than that of the said cylinders with continuous walls; and also the weight of the material employed and therefore the price of the coils will be in most cases much lower than the price of the cylinders having continuous walls.

Further during distillation of a liquid or the washing of gases, the drops of liquid which wet the windings extend by capillary action between adjacent convolutions and wet instantaneously their outer and inner surfaces, which cannot happen with cylinders having smooth walls.

In the drawing:

Figure 1 is a sectional elevation of a distilling apparatus embodying the present invention.

Fig. 2 is a similar view showing another form of distilling apparatus.

Fig. 3 is a sectional elevation illustrating a form of gas washing apparatus in which the present invention is embodied.

Fig. 4 is an elevation of one of the coils employed and

Fig. 5 is an enlarged elevation and partial cross section of this coil.

Referring to the drawing it will be seen that in carrying out my present invention I employ a coil $a$, of metallic wire or other suitable material so formed that the convolutions thereof are sufficiently close to one another to permit of capillary action in carrying out the invention. By this action as clearly illustrated in Fig. 5, the liquid being treated by distillation or otherwise, or being employed to wash or cool gases, wets the entire surface of the coil and extends between the convolutions thereof as indicated at $n$ so as to form a cylinder of the liquid, the wall of which is entirely closed. Such a coil may be suitably placed in a vessel used for distilling a liquid or through which a gas may be passed in order to wash or cool the same by the liquid adhering to the surface of the coils. By reference to Fig. 1 it will be seen that the coils hereinbefore described will be employed in conjunction with a distilling apparatus comprising a boiler $a'$ fitted with a column or tower $b$ in which these coils are placed promiscuously or in any desired manner. On the top of the tower or column $b$ I may employ a thermometer $c$ and the tower may be connected by a pipe $d$ with a condenser $e$ to which the products of distillation are conveyed and condensed. In Fig. 2 I have shown another form of distilling apparatus in which the boiler is indicated at $a'$ and is also provided with a column or tower $b$. In this instance the column or tower $b$ is separately supported and connected at the bottom to the boiler $a'$ by a suitable pipe $f$, the bottom of the tower being also connected to the boiler by a pipe $g$ which permits that portion of the liquid under treatment which condenses in the tower to return to the boiler. At the same time this pipe is provided with a U-bend which forms a liquid seal and prevents the passage of gases from the tower to the boiler or vice-versa. In this form of apparatus the thermometer $c$ may also be fitted to the top of the tower or column $b$ and the same connected by a pipe $d$ to a condenser $e$. In this instance furthermore, the tower or column $h$ is filled or substantially filled with the promiscuously placed coils of close convolution as hereinbefore described. In Fig. 3 I have illustrated a form of gas washing apparatus which preferably comprises a tower or column $h$ in which the coils of close convolution are placed. In this instance the gas to be washed is preferably passed to the bottom of the tower by a pipe $i$ and after being washed is conveyed from the tower by a pipe $l$. In the top of the tower there is a spray $k$ by which the liquid employed is admitted to the tower and at the bottom of the tower there is a pipe connection $m$ by which the washing liquid is conveyed from the tower.

In these and all other instances in which the present invention may be utilized, the surfaces of the coils are wet by the liquid and due to capillary action the entire surface of the coils is spread with a thin film of the liquid so that in the distilling apparatus a relatively large proportion of the surface of the liquid is presented for action by the heat or other agent employed in the distilling operation, and in the gas washing apparatus a relatively large surface of the liquid employed to wash the gas is presented to the gas to be washed. In both instances the course of the gas used as a heating agent, or the gas to be washed, is caused to flow through the closed cylinders of the liquid on the surfaces of the coils in numerous short paths and in as many different directions.

I claim:

1. A contact body for use as a unit for a filling in a gas and liquid contact apparatus, comprising an open ended cylindrical member having parts spaced so as to permit a liquid by capillary action to extend between the spaced parts and to cover the entire surface of the cylindrical body, thus forming a substantially complete cylindrical wall of the liquid.

2. A filling for use in a chamber of a gas and liquid contact apparatus, comprising a plurality of open ended coils, each coil being so wound that the convolutions thereof are placed sufficiently close to one another to permit a liquid by capillary action to extend between the convolutions in order to cover the entire surface of the coil, and thus form thereon a complete cylindrical wall of the liquid.

In testimony whereof I have affixed my signature in presence of two witnesses.

DR. GEORGES EDMOND DARIER.

Witnesses:
 Dr. ROB. DE WERTHENBURG,
 LOUIS H. WERNIG.